(12) United States Patent
Isberg et al.

(10) Patent No.: US 11,558,767 B2
(45) Date of Patent: Jan. 17, 2023

(54) ELECTRONIC DEVICE AND RELATED METHODS FOR PREDICTING INITIATION OF ESTABLISHMENT OF A NETWORK WITH ONE OR MORE OTHER ELECTRONIC DEVICES

(71) Applicant: Sony Corporation, Tokyo (JP)

(72) Inventors: Anders Isberg, Lund (SE); Sangxia Huang, Lund (SE)

(73) Assignee: Sony Group Corporation, Tokyo (JP)

( * ) Notice: Subject to any disclaimer, the term of this patent is extended or adjusted under 35 U.S.C. 154(b) by 59 days.

(21) Appl. No.: 17/170,323

(22) Filed: Feb. 8, 2021

(65) Prior Publication Data

US 2021/0306890 A1  Sep. 30, 2021

(30) Foreign Application Priority Data

Mar. 26, 2020  (SE) .................................. 2050336-3

(51) Int. Cl.
*H04W 24/10* (2009.01)
*H04W 4/50* (2018.01)
*H04W 76/10* (2018.01)
*G06K 9/62* (2022.01)
*H04W 52/02* (2009.01)

(52) U.S. Cl.
CPC .......... *H04W 24/10* (2013.01); *G06K 9/6256* (2013.01); *H04W 4/50* (2018.02); *H04W 52/0258* (2013.01); *H04W 76/10* (2018.02)

(58) Field of Classification Search
CPC ....... H04W 24/10; H04W 4/50; H04W 76/10; H04W 52/0258; G06K 9/6256

USPC .................................................. 370/276, 277
See application file for complete search history.

(56) References Cited

U.S. PATENT DOCUMENTS

| 9,300,581 | B1 | 3/2016 | Hui |
| 10,545,845 | B1 | 1/2020 | Heliker |
| 2008/0150714 | A1 | 6/2008 | Bauer |
| 2010/0003994 | A1 | 1/2010 | Akiyama |

(Continued)

FOREIGN PATENT DOCUMENTS

| CN | 102625425 A | 8/2012 |
| CN | 103152749 B | 5/2017 |

(Continued)

OTHER PUBLICATIONS

The extended European Search Report from corresponding European Application No. 21157883.6, dated Aug. 4, 2021, 9 pages.

(Continued)

*Primary Examiner* — Obaidul Huq
(74) *Attorney, Agent, or Firm* — Tucker Ellis LLP

(57) ABSTRACT

An electronic device includes a memory circuitry, an interface circuitry, a sensor circuitry, and a processor circuitry having a predictor circuitry configured to operate according to a prediction model. The processor circuitry is configured to obtain sensor data. The processor circuitry is configured to determine, based on the sensor data, using the predictor circuitry, a predicted time parameter indicative of a prediction of a time slot to initiate an establishment of a network with one or more other electronic devices. The processor circuitry is configured to initiate the establishment of the network with the one or more other electronic devices according to the predicted time parameter.

20 Claims, 4 Drawing Sheets

(56) References Cited

U.S. PATENT DOCUMENTS

2013/0182584 A1 7/2013 Maguluri et al.
2017/0374623 A1 12/2017 Dhar
2019/0213504 A1 7/2019 Vasseur
2021/0204300 A1* 7/2021 Hu .................... H04W 72/0446

FOREIGN PATENT DOCUMENTS

EP       3343363 A2   7/2018
WO    2018100383 A1   6/2018
WO    2019185765 A1  10/2019

OTHER PUBLICATIONS

Swedish Office Action and Search Repod from corresponding Swedish Application No. 2050336-3, dated Nov. 16, 2020,10 pages.

* cited by examiner

ELECTRONIC DEVICE AND RELATED METHODS FOR PREDICTING INITIATION OF ESTABLISHMENT OF A NETWORK WITH ONE OR MORE OTHER ELECTRONIC DEVICES

RELATED APPLICATION DATA

This application claims the benefit of Swedish Patent Application No. 2050336-3, filed Mar. 26, 2020, the disclosure of which is incorporated herein by reference in its entirety.

TECHNICAL FIELD

The present disclosure pertains to the field of Internet of things, and electronic devices. The present disclosure relates to an electronic device and to a method for predicting initiation of establishment of a network with one or more other electronic devices.

BACKGROUND

There are many scenarios where electronic devices (such as Internet of things, IoT, devices and sensor devices) need to perform some sensing tasks and report measured values (such as to a server). Local networks such as mesh networks may be used to communicate between electronic devices (for example, between low power consumption electronic devices, such as short range bearers). A mesh network topology may provide the possibility to communicate efficiently between devices with low power consumption. The mesh protocol may handle routing and make the network self-managing and self-healing. The routing of package to the correct destination may be handled by the network protocol which hides the complexity of reaching correct end node from the application layer.

However, local networks such as mesh networks may provide a more complex communication with more steps (such as more signaling). For example, when electronic devices join or leave the network or move physically, the network topology is changed.

Those changes may need to be communicated to other nodes in the network to make correct routing decisions (such as propagated to all routers, such that the routing tables may be updated in each node acting as a router). Therefore, current mesh protocols experience high power consumption when the electronic devices (such as sensor devices) are moving or leaving or joining the network (such as often, such as with a high frequency). For example, electronic devices that are joining or leaving the network may cause an increased load in the network.

Power optimization is therefore a challenging aspect of the design of electronic devices such as connected devices and IoT devices. It may be challenging to reduce energy consumption of electronic devices for example to ensure that a battery powered electronic device may be working for its intended operation time (such as battery powered devices that should be able to run for months without recharging or replacing the battery).

SUMMARY

Existing networks may comprise mechanisms for improving power efficiency (such as by introducing time slotting) when the network has a stable topology. For example, even more complex nodes in the networks, like routing nodes, may be in low power mode when there is no data traffic scheduled. This may work well for networks where the nodes are not moving or leaving or joining the network (such as electronic devices joining and/or leaving the network with a low frequency).

However, this needs to be improved for electronic devices in a network that experiences frequent topological changes (for example with mobile nodes). For example, when an electronic device (for example, so-called node) in the network moves, the electronic device needs to detect new neighbor electronic device (such as new neighbor nodes), to maintain the connection to the network. In addition, the changes may need to be propagated to other routers in the network so that the routing tables may be updated in the routing nodes. This overhead consumes power and also affects the robustness of the network since it takes time before the routing tables are updated.

In many use cases, it may not be required to have the network up and running at all time (such as 24/7). For example, tasks like harvesting of sensor data or distribution of content are not required to be done in a real time fashion, and may be allowed to be done over hours or days. There is a need for a solution where a network may be established only when it is convenient (such as only when it is predicted that it is a good time to do so).

Accordingly, there is a need for electronic devices and methods for predicting initiation of establishment of a network with one or more other electronic devices which mitigate, alleviate or address the shortcomings existing and provide an improved establishment of network with improved timing of establishment of a network and an improved power efficiency of electronic devices.

The present disclosure provides an electronic device. The electronic device comprises a memory circuitry, an interface circuitry, a sensor circuitry, and a processor circuitry. The processor circuitry comprises a predictor circuitry configured to operate according to a prediction model. The processor circuitry is configured to obtain sensor data. The processor circuitry is configured to determine based on the sensor data, using the predictor circuitry, a predicted time parameter indicative of a prediction of a time slot to initiate an establishment of a network with one or more other electronic devices. The processor circuitry is configured to initiate the establishment of the network with the one or more other electronic devices according to the predicted time parameter.

Further, a method, performed by an electronic device, for predicting initiation of establishment of a network with one or more other electronic devices, is provided. The method comprises obtaining the sensor data. The method comprises determining, based on the sensor data and a prediction model, a predicted time parameter indicative of a prediction of a time slot to initiate an establishment of a network with one or more other electronic devices.

The method comprises initiating the establishment of the network with the one or more other electronic devices according to the predicted time parameter.

It is an advantage of the present disclosure that the network establishment is improved, allowing the electronic device disclosed herein to establish a network with other electronic device(s) at a suitable time based on prediction. For example, by using a predictor circuitry (such as to provide a prediction of a time slot to initiate an establishment of a network with one or more other electronic devices) the network may for example be established when the electronic device(s) forming the network are likely to have a static location for a period of time. By using a predictor circuitry, it may be possible to do the prediction based on sensor data indicative of a context of the electronic device (such as activity).

It is an advantage of the present disclosure that the power consumption of the electronic device may be more efficient and thereby reduced. This may be achieved by optimizing the initiation of the establishment of the network with the one or more other electronic devices according to the predicted time parameter, such as to reduce unnecessary communication and return to low power mode once the scheduled tasks have been concluded over the network. In addition, by continuously learning and sharing parameters of the predictor circuitry with other nodes in the network, the predictor circuitry is capable of adapting and improving the predictions over time, based on the environment. By sharing predictor parameters among nodes in the network, the predictor circuitry may be improved: faster processing and lower communication overhead.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
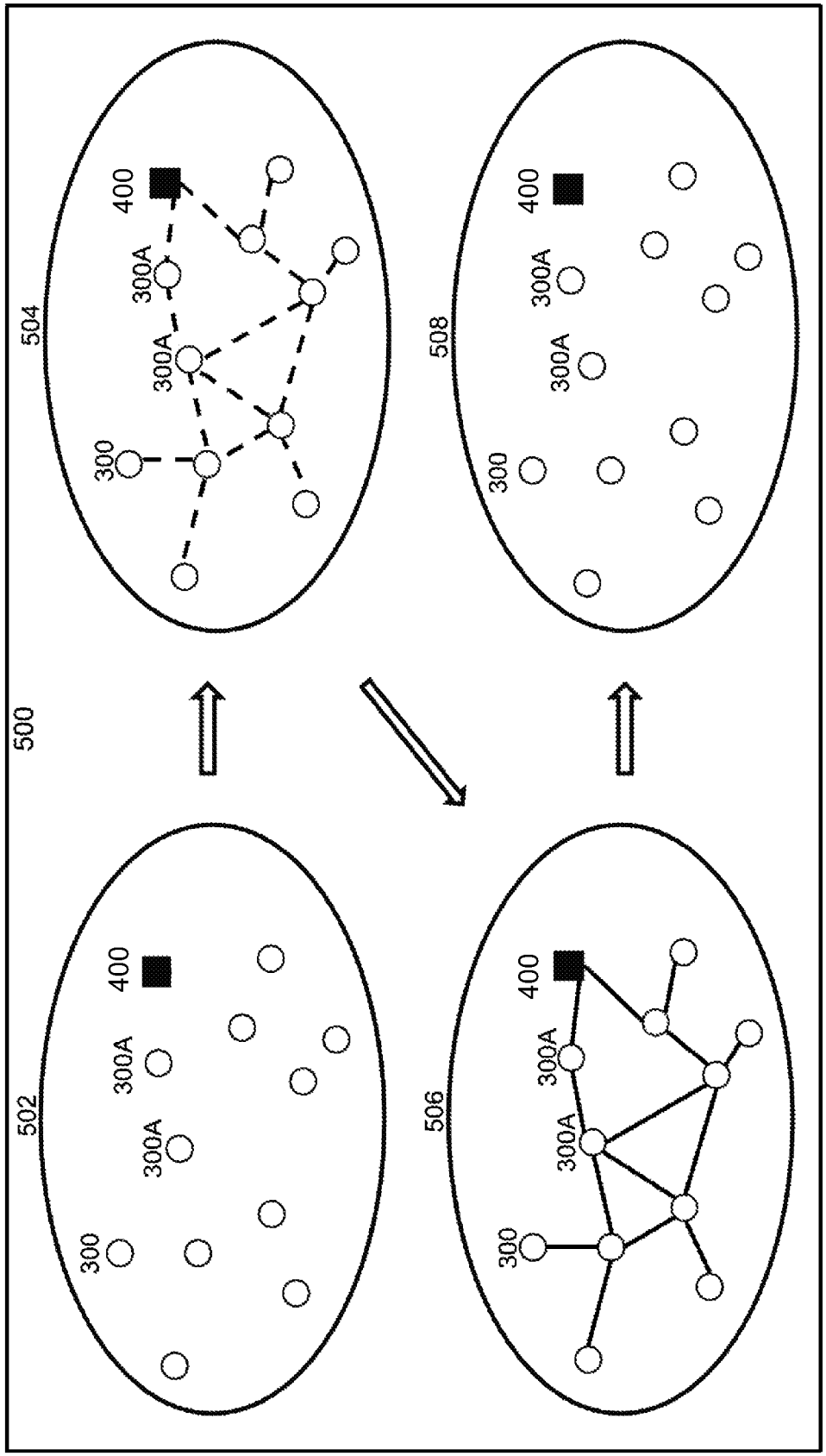
FIG. 1 is a schematic representation illustrating an example of a scenario for predicting initiation of establishment of a network with one or more other electronic devices according to one or more embodiments of this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a schematic representation 500 illustrating an example of a scenario for predicting initiation of establishment of a network with one or more other electronic devices according to one or more embodiments of this disclosure. FIG. 1 shows an electronic device 300 and one or more other electronic devices 300A. Optionally, a service device 400 (such as having a role of a border gateway) may be present, for example to report the sensor data to an external network (such as the internet, a server, and/or a cloud server). The border gateway may be an internet protocol (IP) router, such as a gateway to the internet. The border gateway may comprise a first interface (such as a first network interface) to the network including the electronic devices 300, 300A and a second interface (such as a second network interface, for example via connections such as long term evolution, LTE, wireless fidelity, Wi-Fi, and/or an ethernet cable) to an external network (such as a global network, such as the internet).

In some embodiments, the service device 400 may be comprised in the electronic device 300 (such as co-located with the electronic device).

The electronic device 300 and the one or more other electronic devices 300A may be seen as wireless connectivity devices such as an IoT devices (such as sensor devices, for example nodes comprising a short range radio circuitry, a clock circuitry, and a predictor circuitry) configured to obtain sensor data, to determine based on the sensor data, using the predictor circuitry, a predicted time parameter indicative of a prediction of a time slot to initiate an establishment of a network with one or more other electronic devices, and to initiate the establishment of the network with the one or more other electronic devices according to the predicted time parameter.

The example electronic device 300 illustrated in FIG. 1 shows a four step approach of a scenario for predicting initiation of establishment of a network with one or more other electronic devices. In a first step 502, the electronic device 300 and the one or more other electronic devices 300A obtain sensor data, for example the electronic device 300 and the one or more other electronic devices 300A may be considered as a group of sensing devices in low power mode obtaining sensor data (such as data sensed by the sensor circuitry). In a second step 504, the processor circuitry (such as processing circuitry 302 of FIG. 2) is configured to determine, based on the sensor data, using the predictor circuitry, a predicted time parameter indicative of a prediction of a time slot to initiate an establishment of a network with one or more other electronic devices (such as the predictor indicates that a network shall be formed). The sensor data used by the predictor circuitry and the data sensed by the sensor circuitry of the electronic device 300 may be different sensor data. For example, in a scenario where the electronic device is used for goods in a refrigerated truck, the end user may only be interested in sensor data such as temperature data sensed by a sensor circuitry such as a thermometer, whereas for the predictor circuitry, sensor data such as motion data from a sensor circuitry such as an accelerometer may be more relevant. The processor circuitry is configured to initiate the establishment of the network with the one or more other electronic devices 300A according to the predicted time parameter. In other words, the electronic device 300 and the one or more other electronic devices 300A can start to form the network based on the determination of the predictor circuitries in the electronic devices. In a third step 506, the initiation is completed, and the network is established (in other words the network is formed) and a task may be executed (for example the sensor data may be reported, such as upload the sensed data). In a fourth step 508, the task has been performed or completed (for example the sensor data has been reported) and the electronic device 300 and the one or more other electronic devices 300A may enter a power saving mode.

Example environments where the disclosed technique may be applied may include applications such as farming (for example, a herd of animals with sensor devices, such as activity sensors, for example for use in smart farming), tracking (such as trackers loaded on vehicles, for example trucks, ferries, trains, cars in a parking lot and/or plains, and/or trackers in a warehouse, such as trackers loaded on packages), sensing of humans (such as sitting at a desk or on the same train)). For example, a condition of an animal may be detected and analysed (for example if the activity of an animal is lower, it may be sick, or if the temperature of the animal is higher, the animal may be in gestation). Further, it may be possible to have a traceability of an object that the electronic device is mounted on (for example if a herd of animals are grazing in different areas, it may be possible to track which area is the best for the meat outcome, for example when a good is tracked to have enter a zone, a notification may be sent to recipient or sender). The present disclosure may be applicable to star networks as well, where routing information needs to be transferred to master nodes and the back-bone network for the master network.

The present disclosure proposes techniques for how to determine a predicted time parameter indicative of a prediction of a time slot to initiate an establishment of a network, for example to predict a convenient time for establishing the network and eventually execute a task (such as reporting sensor data). In other words, the present disclosure proposes techniques where electronic devices have the capability to establish (such as form) a local network over the electronic devices (such as short range bearers), where the establishing of the local network and execution of a task (such as reporting sensor data) in the network may be triggered based on a predicted time parameter indicative of a prediction of a time slot (by using a predictor circuitry, such as a context aware predictor).

Figure 2:
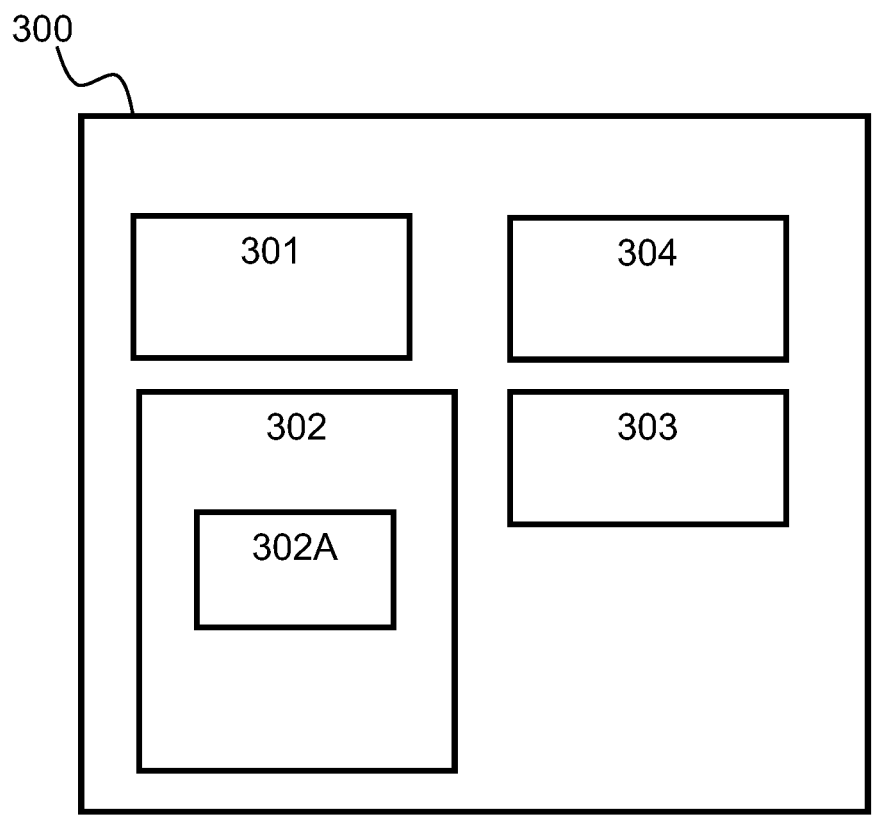
FIG. 2 is a block diagram illustrating an example electronic device according to this disclosure.

FIG. 2 is a block diagram illustrating an example electronic device 300 according to one or more embodiments of the present disclosure.

The electronic device 300 comprises a memory circuitry 301, an interface circuitry 303, a sensor circuitry 304, and a processor circuitry 302 comprising a predictor circuitry 302A. The predictor circuitry 302A is configured to operate according to a prediction model. The electronic device 300 may for example be a portable electronic device, such as an IoT device, a sensing device, an activity sensor, and/or a tracking device. The predictor circuitry 302A may be configured to operate according to one or more prediction models of various complexity. In one or more embodiments, the predictor circuitry 302A may be configured to operate according to a prediction model that may be configured manually (such as a minimal predictor). This may for example be a low efficiency scheduler that guarantees a minimum quality of service.

The processor circuitry 302 is configured to obtain sensor data. In one or more embodiments, the sensor data may be obtained by the processor circuitry 302 from the sensor circuitry 304. The sensor data may comprise one or more of: location data (such as global positioning system (GPS) coordinates) from a sensor circuitry such as positioning sensor, accelerometer data from a sensor circuitry such as an accelerometer, time data (such as time of the day) from a clock, gyroscope data, temperature data from a thermometer, sleep data (such as measured or sensed by a sleep sensor), pulse data (such as measured or sensed by a pulse sensor), light data from a photo-sensor, humidity data from a hygrometer, sound data (such as voice) data from a microphone, photo or video data from a camera, and/or pressure data from a pressure sensor.

The processor circuitry 302 is configured to determine, based on the sensor data, using the predictor circuitry 302A, a predicted time parameter indicative of a prediction of a time slot to initiate an establishment of a network with one or more other electronic devices.

A predicted time parameter indicative of a prediction of a time slot to initiate an establishment of a network with one or more other electronic devices may in other words comprise or be indicative of a time where it is likely to successfully establish a network.

The predicted time parameter may be indicative of a prediction of a time slot where it is suitable, opportune, and/or convenient for the electronic device to establish the network with one or more other electronic devices. This may for example be a time slot where the electronic device 300 and the one or more other electronic devices 300A are within a certain distance from each other (for example within a radius of 1 m, 2 m, 5 m, 10 m, 30 m, 50 m, 100 m).

In other words, the processor circuitry 302 is configured to generate by feeding the sensor data (such as sensor values) for example in a recent time window to the predictor circuitry 302A, whereby a predicted time parameter indicative of a prediction of a time slot to initiate an establishment of a network with one or more other electronic devices (such as a trigger that may be generated for when it is feasible to establish the network).

The predicted time parameter may comprise or be indicative of one or more time periods, time slots, and/or time intervals. In one or more embodiments, the sensor data may be used to predict a time suitable to establish the network.

The processor circuitry 302 is configured to initiate the establishment of the network with the one or more other electronic devices according to the predicted time parameter. The processor circuitry 302 may be configured to successfully establish a network. In one or more embodiments, the processor circuitry 302 may be configured to report the obtained sensor data. The network may be a decentralized type of wireless network comprising a plurality of electronic devices. The network to be established may for example comprise a local network, and/or an ad hoc network, such as a mobile ad hoc network, MANET, a mesh network, a star network and/or a tree network.

In one or more embodiments, the processor circuitry 302 may be configured to determine that the one or more other electronic devices start joining the established network when each of the one or more electronic device have determined (for example by using their own predictor circuitries) a predicted time parameter to establish the network (for example, a feasible time that is likely to overlap or coincide with the predicted time parameter determined by electronic device 300). In one or more embodiments, the one or more other electronic devices may comprise equivalent predictor circuitries. For example, the one or more other electronic devices may be peers of the electronic device 300.

The processor circuitry 302 may be configured to initiate the establishment of the network with the one or more other electronic devices according to the predicted time parameter and a Quality-of-Service (QoS) mechanism, in order to guarantee a minimum QoS. In one or more embodiments, the processor circuitry may be configured to initiate the establishment of the network with the one or more other electronic devices according to the predicted time parameter such that a minimum quality of service may be provided.

The processor circuitry 302 may be configured to initiate the establishment of the network with the one or more other electronic devices according to the predicted time parameter and a random factor. For example, even if the predicted time parameter is not determined to be optimal, a random factor may be introduced for reinforcement learning. For example, at certain intervals (such as 5% of the time), the processor circuitry may be configured to initiate the establishment of the network. This may encourage the prediction model to learn more about the environment and for example avoid remaining in a locally optimal strategy (such as in the farming scenario, the electronic devices of half of herd of animals learned to establish a network at dawn and the other half learned to establish a network in the evening).

An example scenario may for example be in a farming application, where one or more animals, wearing one or more electronic devices according to the present disclosure, may be active during daytime, may be spread out from each other, and/or may be far from the farm where the sensor data is to be reported. Then, when dawn or night comes, the animals may gather again in the farm. The predicted time parameter may for example be indicative of the prediction of the time slot where the animals gather in the farm again for dawn or at night (for example for sleeping or eating), and thereby a convenient time slot for initiating an establishment of a network with the one or more other electronic devices worn by the other animals, since the one or more electronic devices are closer to each other than during daytime and thereby a network (such as a local network) may be established between the one or more electronic devices.

In one or more example electronic devices, the sensor data comprises one or more of: data sensed by the sensor circuitry, and network quality data. The sensor data may comprise time data indicative of the time of the day and/or the date of the day.

In one or more example electronic devices, the network quality data comprises one or more of: a time parameter, a latency parameter, a channel quality parameter, and a retransmission parameter. In one or more embodiments, the sensor data (such as sensor values) may be recorded with the current time as well as measurement of network quality data (such as time to connect, latency, retries). The network quality data may for example comprise a time to connect, a latency of the network, a number of retries, a bandwidth of the network, a signal strength of a received signal, a transmission power of a transmitted signal, and/or a packet loss rate. For example, if a channel time slotting (such as channel hopping) applies, the network quality data (such as network conditions) may vary based on which band or timeslot is used.

In one or more embodiments, the network quality data may be used to train a network quality in the prediction model.

In one or more example electronic devices, the sensor data comprises current sensor data and historical sensor data. Historical sensor data may for example comprise or be indicative of a time slot and/or a historical date where it is efficient to perform sensor data reporting (for example in farming, because all the animals are asleep, in tracking because the trackers appear to be semi-static or static). This may for example be indicated by the lack of activity of the animals or a lack of movements of objects in a certain time period. In one or more embodiments, the historical sensor data may be used to determine a pattern in the events that are measured (for example the sleep pattern of animals, and/or a tracking pattern).

In one or more example electronic devices, the prediction model comprises one or more of: a regression model and a classification model. The prediction model may for example comprise or make use of a logistic regression, a gradient boosting, a neural network, artificial intelligence, deep learning, and/or machine learning. The processor circuitry 302, and/or elements of the processor circuitry 302, such as the predictor circuitry 302A, in one or more embodiments, may be configured to employ artificial intelligence scheme(s) and/or be trained using a supervised machine learning scheme and/or using an unsupervised machine learning scheme.

The prediction model may be based on a neural network (such as a convolutional neural network, a deep learning neural network, and/or a combined learning circuitry). The predictor circuitry 302A may be configured to determine (and optionally identify) one or more patterns in existing data (sensor data, and/or predicted time parameter data) in order to facilitate making predictions for subsequent predicted time parameter. Additional prediction models may be generated to provide substantially reliable predictions of time parameters for network establishment.

The predictor circuitry 302A may be configured to operate according to a supervised machine learning scheme configured to determine a rule or a pattern or a relation that maps inputs to outputs, so that when subsequent novel inputs are provided the predictor circuitry 302A may, based upon the rule, pattern or relation, accurately predict the correct output. In some embodiments, the prediction model may first extract one or more features from input sensor data, such as by using signal processing methods (such as filters), statistics of the signals (such as mean, max, median, and/or quantile), and/or results from unsupervised learning methods (such as dimension reduction methods, clustering, and/or auto-encoder). The one or more features may then be fed into a regression and/or classification model that is trained using supervised machine learning techniques. Furthermore, a regularization scheme may be applied to reduce overfitting (for example, limiting the depth of trees in random forest, or some loss term for the size of the weights of a neural network, etc.).

In one or more example electronic devices, the processor circuitry 302 is configured to perform a service discovery to find a service in the network. The processor circuitry 302 may be configured to perform a service discovery to find a service in the network, such as a data storage service, a firmware update service, a prediction model parameter updating or sharing service, and/or a task scheduler service.

In one or more example electronic devices, the processor circuitry 302 is configured to communicate, for example via the interface 303, with a service device and to determine with the service device a scheme for how sensor data is to be reported. In other words, the electronic device 300 may contact the service device and agree on a scheme for how sensor data may be reported (such as, sensor data sent), for example based on how much sensor data that is to be transferred and depending on the requirements from the other nodes in the network.

In one or more example electronic devices, the processor circuitry 302 is configured to enter a power saving mode after reporting sensor data.

In other words, when the electronic device 300 has terminated the reporting of sensor data (such as concluded the task to be done) and is not relaying sensor data for other electronic devices (such as other nodes), the electronic device may enter a power saving mode (such as switching off the radio).

In one or more example electronic devices, the processor circuitry 302 is configured to determine, based on a previously determined predicted time parameter, the predicted time parameter. For example, the prediction model that the predictor circuitry operates according to, may be updated at regular interval based on recent sensor data recorded.

In one or more example electronic devices, the processor circuitry 302 is configured to train and/or update the prediction model based on one or more of: the sensor data, and the predicted time parameter. In one or more embodiments, the processor circuitry 302 may be configured to train and/or update the prediction model based on the outcome of the network establishment (for example, by comparing the predicted time parameter and the time it actually took to establish the network). The prediction model that the predictor circuitry operates according to, may be trained and/or updated (such as retrained or finetuned). The training of the prediction model may be a supervised learning setup, where the sensor data in the input data and the network quality data can be labelled. The prediction model or changes to the prediction model may be based on new data, such as new sensor data, and/or new prediction data.

In one or more example electronic devices, the processor circuitry 302 is configured to transmit, for example via the interface 303, the prediction model and/or parameters indicative of the prediction model to the one or more other electronic devices.

In one or more example electronic devices, the processor circuitry 302 is configured to transmit, for example via the interface 303, the updated and/or trained prediction model (and/or a lossy compressed version of the prediction model). In other words, the prediction model and/or parameters indicative of the prediction model (such as a trained and/or updated prediction model) may be shared and/or updated between the electronic device and the one or more other electronic devices (for example by using federated learning techniques, such as when the network is established). This may provide a faster and more robust training, updating, learning and/or adaptation. In one or more embodiments, the transmission (such as sharing) of the prediction model and/or parameters indicative of the prediction model to the one or more other electronic devices may for example be performed using broadcast, multicast, anycast, and/or unicast.

Figure 3A:
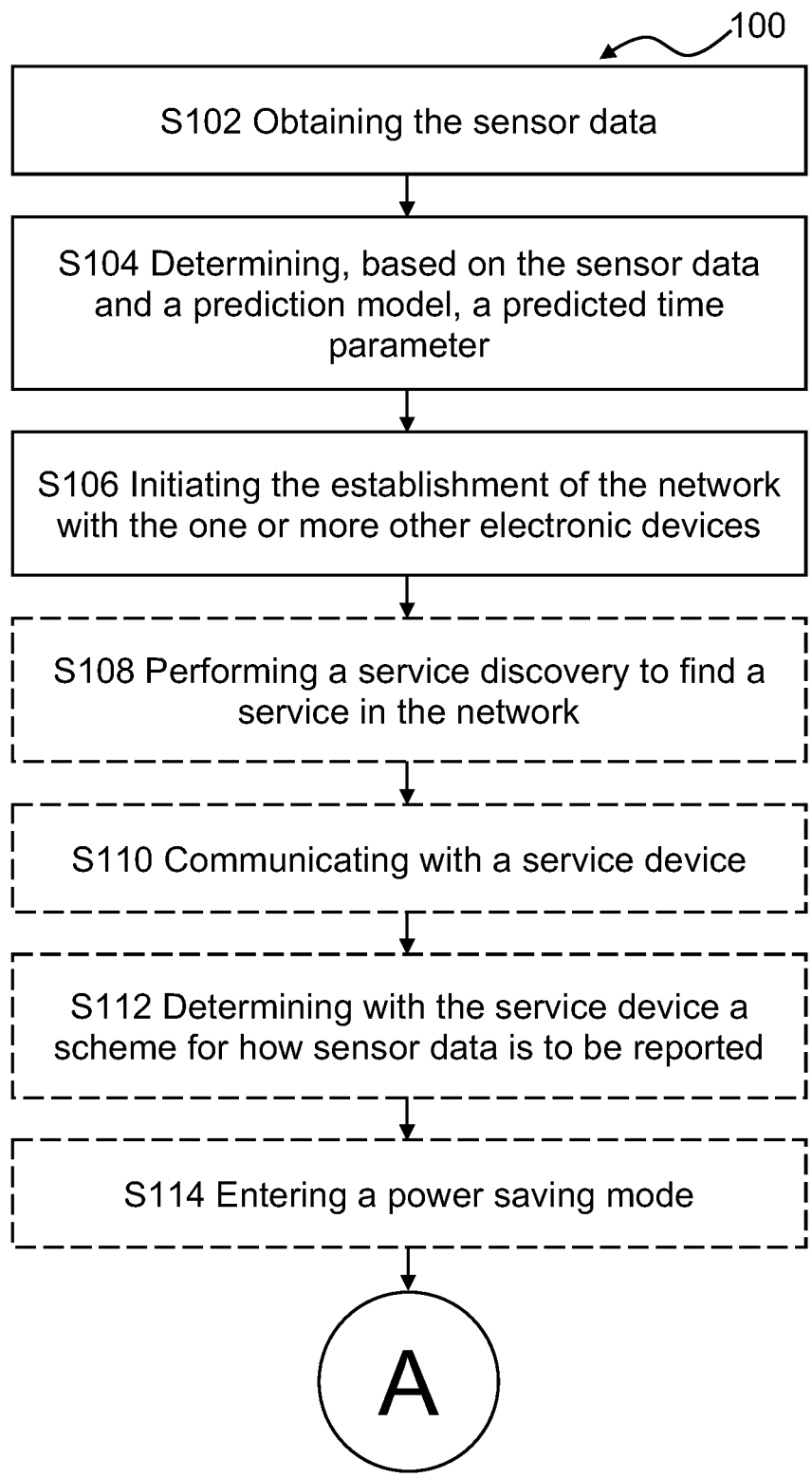
FIGS. 3A and 3B are flow-charts illustrating an example method, performed by an electronic device, for predicting initiation of establishment of a network with one or more other electronic devices according to this disclosure.
Figure 3B:
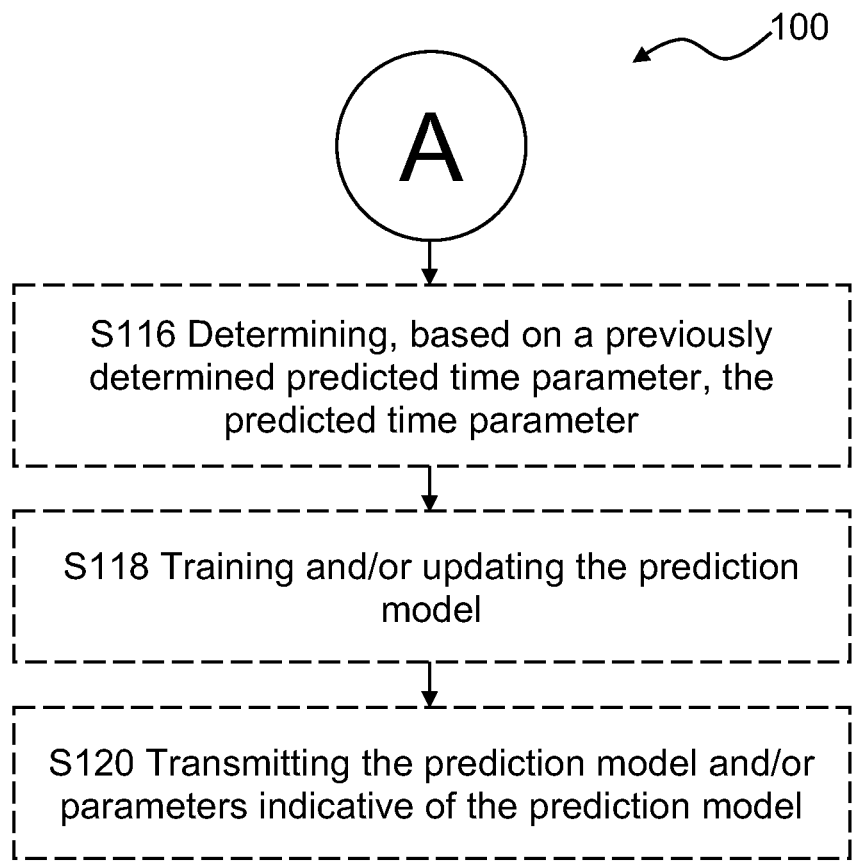

The processor circuitry 302 is optionally configured to perform any of the operations disclosed in FIGS. 3A-B (such as any one or more of S108, S110, S112, S114, S116, S118, S120). The operations of the electronic device 300 may be embodied in the form of executable logic routines (such as lines of code, software programs, etc.) that are stored on a non-transitory computer readable medium (such as on the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 2). The memory circuitry 301 is considered a non-transitory computer readable medium.

The memory circuitry 301 may be configured to store the prediction model, the sensor data, the one or more predicted time parameter, and/or the parameters of the prediction model in a part of the memory.

FIGS. 3A and 3B show flow-charts illustrating an example method 100 performed by an electronic device (such as the electronic device disclosed herein, such as electronic device 300 of FIGS. 1 and 2), for predicting initiation of establishment of a network with one or more other electronic devices (such as the one or more other electronic devices disclosed herein, such as the one or more other electronic devices 300A of FIG. 1 and FIG. 2).

The method 100 comprises obtaining S102 sensor data.

The method 100 comprises determining S104, based on the sensor data and a prediction model, a predicted time parameter indicative of a prediction of a time slot to initiate an establishment of a network with one or more other electronic devices.

The method 100 comprises initiating S106 the establishment of the network with the one or more other electronic devices according to the predicted time parameter.

In one or more example methods, the sensor data comprises one or more of: data sensed by the sensor circuitry, and network quality data.

In one or more example methods, the network quality data comprises one or more of: a time parameter, a latency parameter, a channel quality parameter, and a retransmission parameter.

In one or more example methods, the sensor data comprises current sensor data and historical sensor data.

In one or more example methods, the prediction model comprises one or more of: a regression model and a classification model.

In one or more example methods, the method 100 comprises performing S108 a service discovery to find a service in the network.

In one or more example methods, the method 100 comprises communicating S110 with a service device.

In one or more example methods, the method 100 comprises determining S112 with the service device a scheme for how sensor data is to be reported.

In one or more example methods, the method 100 comprises entering S114 a power saving mode after reporting sensor data.

In one or more example methods, the method 100 comprises determining S116, based on a previously determined predicted time parameter, the predicted time parameter.

In one or more example methods, the method 100 comprises training and/or updating S118 the prediction model based on one or more of: the sensor data, and the predicted time parameter.

In one or more example methods, the method 100 comprises transmitting S120 the prediction model and/or parameters indicative of the prediction model to the one or more other electronic devices.

Embodiments of methods and electronic devices according to the disclosure are set out in the following items:

Item 1. An electronic device (300) comprising:
  a memory circuitry (301);
  an interface circuitry (303);
  a sensor circuitry (304) and
  a processor circuitry (302) comprising a predictor circuitry (302A) configured to operate according to a prediction model;
  the processor circuitry (302) being configured to:
    obtain sensor data;
    determine, based on the sensor data, using the predictor circuitry (302A), a predicted time parameter indicative of a prediction of a time slot to initiate an establishment of a network with one or more other electronic devices; and initiate the establishment of the network with the one or more other electronic devices according to the predicted time parameter.

Item 2. The electronic device according to item 1, wherein the sensor data comprises one or more of: data sensed by the sensor circuitry, and network quality data.

Item 3. The electronic device according to item 2, wherein the network quality data comprises one or more of: a time parameter, a latency parameter, a channel quality parameter, and a retransmission parameter.

Item 4. The electronic device according to any of items 1-3, wherein the sensor data comprises current sensor data and historical sensor data.

Item 5. The electronic device according to any of items 1-4, wherein the prediction model comprises one or more of: a regression model and a classification model.

Item 6. The electronic device according to any of items 1-5, wherein the processor circuitry (302) is configured to perform a service discovery to find a service in the network.

Item 7. The electronic device according to any of items 1-6, wherein the processor circuitry (302) is configured to communicate with a service device and to determine with the service device a scheme for how sensor data is to be reported.

Item 8. The electronic device according to any of items 1-7, wherein the processor circuitry (302) is configured to enter a power saving mode after reporting sensor data.

Item 9. The electronic device according to any of items 1-8, wherein the processor circuitry (302) is configured to determine, based on a previously determined predicted time parameter, the predicted time parameter.

Item 10. The electronic device according to any of items 1-9, wherein the processor circuitry (302) is configured to train and/or update the prediction model based on one or more of: the sensor data, and the predicted time parameter.

Item 11. The electronic device according to any of items 1-10, wherein the processor circuitry (302) is configured to transmit the prediction model and/or parameters indicative of the prediction model to the one or more other electronic devices.

Item 12. A method, performed by an electronic device, for predicting initiation of establishment of a network with one or more other electronic devices, the method comprising:

obtaining (S102) sensor data;

determining (S104), based on the sensor data and a prediction model, a predicted time parameter indicative of a prediction of a time slot to initiate an establishment of a network with one or more other electronic devices; and initiating (S106) the establishment of the network with the one or more other electronic devices according to the predicted time parameter.

Item 13. The method according to item 12, wherein the sensor data comprises one or more of: data sensed by the sensor circuitry, and network quality data.

Item 14. The method according to item 13, wherein the network quality data comprises one or more of: a time parameter, a latency parameter, a channel quality parameter, and a retransmission parameter.

Item 15. The method according to any of items 12-14, wherein the sensor data comprises current sensor data and historical sensor data.

Item 16. The method according to any of items 12-15, wherein the prediction model comprises one or more of: a regression model and a classification model.

Item 17. The method according to any of items 12-16, the method comprising:

performing (S108) a service discovery to find a service in the network.

Item 18. The method according to any of items 12-17, the method comprising:

communicating (S110) with a service device, and determining (S112) with the service device a scheme for how sensor data is to be reported.

Item 19. The method according to any of items 12-18, the method comprising:

entering (S114) a power saving mode after reporting sensor data.

Item 20. The method according to any of items 12-19, the method comprising:

determining (S116), based on a previously determined predicted time parameter, the predicted time parameter.

Item 21. The method according to any of items 12-20, the method comprising:

training and/or updating (S118) the prediction model based on one or more of: the sensor data, and the predicted time parameter.

Item 22. The method according to any of items 12-21, the method comprising:

transmitting (S120) the prediction model and/or parameters indicative of the prediction model to the one or more other electronic devices.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-3B comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device comprising:
   a memory circuitry;
   an interface circuitry;
   a sensor circuitry and
   a processor circuitry comprising a predictor circuitry configured to operate according to a prediction model; the processor circuitry being configured to:
   obtain sensor data, the sensor data comprising one or more of: data sensed by the sensor circuitry, and network quality data;
   determine, based on the sensor data, using the predictor circuitry, a predicted time parameter indicative of a prediction of a time slot to initiate an establishment of a network with one or more other electronic devices; and
   initiate the establishment of the network with the one or more other electronic devices according to the predicted time parameter.

2. The electronic device according to claim 1, wherein the network quality data comprises one or more of: a time parameter, a latency parameter, a channel quality parameter, and a retransmission parameter.

3. The electronic device according to claim 1, wherein the sensor data comprises current sensor data and historical sensor data.

4. The electronic device according to claim 1, wherein the prediction model comprises one or more of: a regression model and a classification model.

5. The electronic device according to claim 1, wherein the processor circuitry is configured to perform a service discovery to find a service in the network.

6. The electronic device according to claim 1, wherein the processor circuitry is configured to communicate with a service device and to determine with the service device a scheme for how sensor data is to be reported.

7. The electronic device according to claim 1, wherein the processor circuitry is configured to enter a power saving mode after reporting sensor data.

8. The electronic device according to claim 1, wherein the processor circuitry is configured to determine, based on a previously determined predicted time parameter, the predicted time parameter.

9. The electronic device according to claim 1, wherein the processor circuitry is configured to train and/or update the prediction model based on one or more of: the sensor data, and the predicted time parameter.

10. The electronic device according to claim 1, wherein the processor circuitry is configured to transmit the prediction model and/or parameters indicative of the prediction model to the one or more other electronic devices.

11. A method, performed by an electronic device comprising a sensor circuitry, for predicting initiation of establishment of a network with one or more other electronic devices, the method comprising:
    obtaining sensor data, the sensor data comprising one or more of: data sensed by the sensor circuitry, and network quality data;
    determining, based on the sensor data and a prediction model, a predicted time parameter indicative of a prediction of a time slot to initiate an establishment of the network with the one or more other electronic devices; and
    initiating the establishment of the network with the one or more other electronic devices according to the predicted time parameter.

12. The method according to claim 11, wherein the network quality data comprises one or more of: a time parameter, a latency parameter, a channel quality parameter, and a retransmission parameter.

13. The method according to claim 11, wherein the sensor data comprises current sensor data and historical sensor data.

14. The method according to claim 11, wherein the prediction model comprises one or more of: a regression model and a classification model.

15. The method according to claim 11, the method comprising:
    performing a service discovery to find a service in the network.

16. The method according to claim 11, the method comprising:
    communicating with a service device, and
    determining with the service device a scheme for how sensor data is to be reported.

17. The method according to claim 11, the method comprising:
    entering a power saving mode after reporting sensor data.

18. The method according to claim 11, the method comprising:
    determining, based on a previously determined predicted time parameter, the predicted time parameter.

19. The method according to claim 11, the method comprising:
 training and/or updating the prediction model based on one or more of: the sensor data, and the predicted time parameter.

20. The method according to claim 11, the method comprising: transmitting the prediction model and/or parameters indicative of the prediction model to the one or more other electronic devices.

* * * * *